United States Patent [19]

Tombs

[11] 3,870,801
[45] Mar. 11, 1975

[54] FLUID AQUEOUS PROTEIN COMPOSITIONS AND FOOD PRODUCTS PREPARED THEREFROM

[75] Inventor: Michael Peter Tombs, Pavenham, England

[73] Assignee: Lever Brothers Company, New York, N.Y.

[22] Filed: Mar. 19, 1973

[21] Appl. No.: 342,590

Related U.S. Application Data

[63] Continuation-in-part of Ser. No. 155,029, June 21, 1971, abandoned, which is a continuation-in-part of Ser. No. 848,600, Aug. 8, 1969, abandoned.

[30] Foreign Application Priority Data
Aug. 9, 1968   Great Britain .................... 38211/68

[52] U.S. Cl............ 426/92, 260/112 R, 260/123.5, 426/93, 426/212, 426/276, 426/364
[51] Int. Cl. .............................................. A23j 3/00
[58] Field of Search...... 260/112 R, 123.5; 426/212, 426/364, 92, 93, 276, 350

[56] References Cited
UNITED STATES PATENTS
3,047,395   7/1962   Rusoff et al. .......................... 99/14
3,498,794   3/1970   Calvert et al. .......................... 99/17
3,627,536   12/1971   Arima et al. ............................ 99/17

OTHER PUBLICATIONS

Altschul, "Processed Plant Protein Foodstuffs,-"Academic Press, New York, 1958, Pages 254–262.

Ziemba, "Let Soy Proteins Work Wonders For You,"- Food Engineering, May 1966, pages 82–83, 87–90, 93.

Primary Examiner—James R. Hoffman
Attorney, Agent, or Firm—Melvin H. Kurtz, Esq.; Arnold Grant, Esq.; James J. Farrell, Esq.

[57] ABSTRACT

Protein, particularly plant protein such as soy, is prepared in the form of a mesophase valuable in food products as a binder in its fluid form or in the form of fibres or set pieces combined with other foodstuffs. The mesophase is a fluid aqueous composition, capable of being heat-coagulated, containing from 15 to 50% dissolved undenatured plant protein and sufficient water-soluble salts to keep the protein dissolved and having a pH in the range of about 4 to 6.

15 Claims, 1 Drawing Figure

PATENTED MAR 11 1975
3,870,801
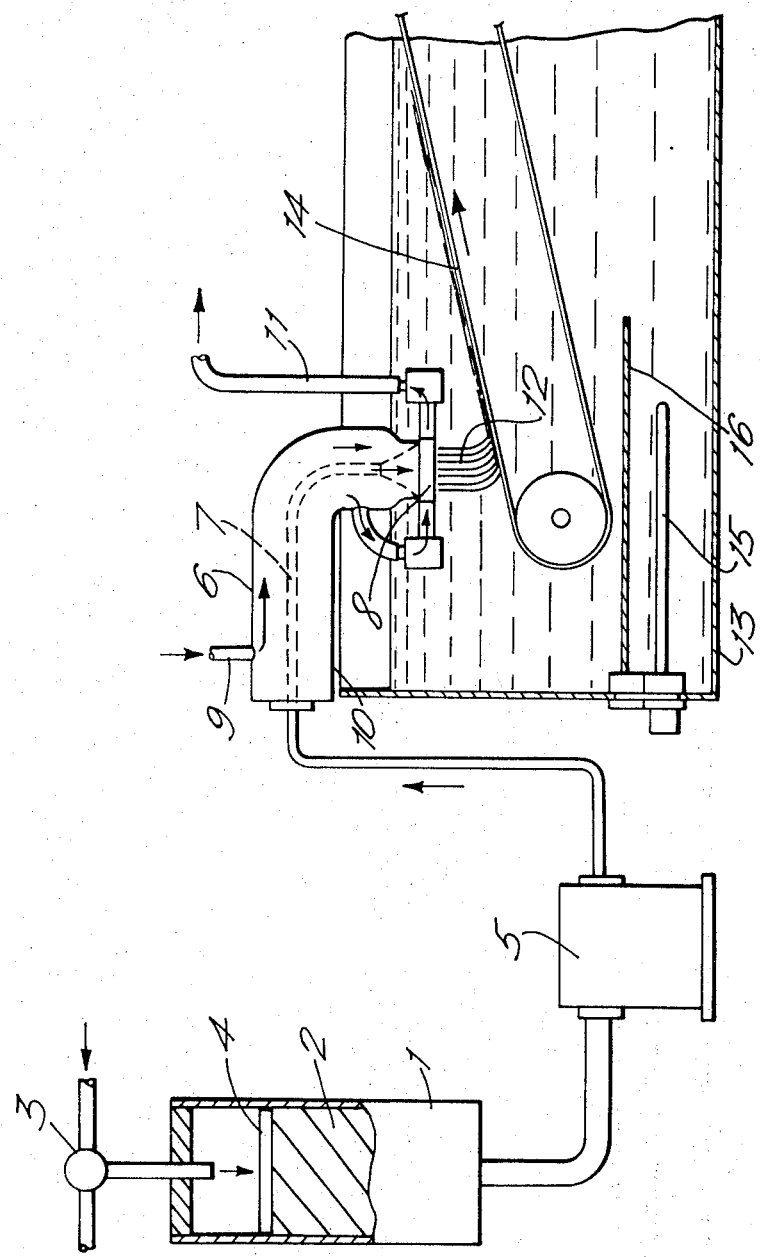
INVENTOR
MICHAEL PETER TOMBS
BY
ATTORNEY

FLUID AQUEOUS PROTEIN COMPOSITIONS AND FOOD PRODUCTS PREPARED THEREFROM

This application is a continuation-in-part of my co-pending patent application Ser. No. 155,029 filed June 21, 1971 which is in turn a continuation-in-part of my application Ser. No. 848,600 filed Aug. 8, 1969, both of which application are now abandoned.

The invention relates to the utilisation of plant protein, particularly in the manufacture of food products.

Edible proteins of plant origin have been extracted from their sources and converted to food products in a number of ways. Thus, in the large-scale extraction of soy protein (see Altschul, *Processed Plant Protein Foodstuffs*, Academic Press Inc., New York (1958) pages 254–262 contributed by Allan K Smith), dehulled substantially oil-free soybean meal is treated with water whose pH is adjusted to be slightly alkaline (up to about pH 9) in order to extract as much as possible of the desired protein. The aqueous extract of soy protein thus formed is separated from insoluble residue, in particular water-insoluble carbohydrate (as distinct from water-soluble sugars), usually by screening and centrifuging. The separated aqueous extract, whose content of dispersed protein is less than 5% by weight and is typically about 3%, is then treated with acid to adjust its pH to 4 – 5 and so precipitate the major proteins. The precipitate formed is separated from the supernatant liquid (whey) by filtration and/or centrifugation as a solid 'isolate', of protein content about 25% by weight (the rest being occluded supernatant), and is washed with water. At the stage of extraction of the meal, sodium sulphite may be used, particularly when producing protein for industrial rather than food uses, to reduce the activity of micro-organisms and to assist in bleaching the protein. Further bleaching can be achieved by precipitating the isolate with sulphur dioxide. Other bleaches are sodium and zinc dithionites.

In laboratory-scale as distinct from large-scale operation (see Allan K Smith of Altschul at page 258), it has been established that treatment of oil-free soybean meal (protein content about 50%) with distilled water at a pH of about 6.6 brings about extraction of some 92% of the protein content of the meal. Low concentrations of neutral salts reduce the extractability of the protein content; thus, Allan K Smith reports that 0.1N sodium chloride in water reduces extractability from 92% to 45%. However, by reference to his article in *Industrial & Engineering Chemistry* 30 (1938) pages 1414 – 1418 written jointly with Sidney J Circle, he goes on to observe that the extraction-depressive effect of salt at 0.1N is overcome at higher (0.5N) concentration. Smith and Circle investigated the extent to which the protein in 2.5 grams of meal of 45% protein content was extracted by 100 ml of various dispersing solutions. They found that 84% of the protein was extracted by water; that inclusion of alkali (the most effective material in increasing extractability) in the water to pH 8 – 12 raised protein extractability to 90 – 95%; that inclusion of 0.1N sodium chloride in the water depressed extractability to 40%, while at 0.5N sodium chloride concentration, extractability of the protein was raised to 70%. In absolute terms, these last results amount to this: that the dissolved protein concentration in aqueous 0.1N NaCl at about neutral pH was about 0.45%, in aqueous 0.5N NaCl at about the same pH it was about 0.8%, and in ordinary water at the same pH it was about 1%. Allan K Smith comments that most industrial sources of water would be too high in salt concentration for extracting protein in good yield, and that alkali must be used to overcome the salt effect.

To turn now from the extraction of plant protein to the utilisation of the extracted material. Although plant protein has a variety of applications (see for example those listed on page 261 of Altschul), that which is probably of most importance at present is in foodstuffs manufacture.

In this art it is known to convert plant protein such as soy into the form of a fluid protein composition and to convert the latter into solid or hardened material utilisable as a component of food products, for example simulated meats. Thus, soy protein may be brought into solution by alkali, and the alkaline solution spun into an acid/salt bath to form protein fibres. A bundle of the soy protein fibres may then be impregnated with an edible binder and fat and compressed into coherent form (U.S. Pat. No. 2,682,466); or, when the binder is a heat-setting one such as an albumen/gluten mixture (U.S. Pat. No. 3,210,195), the impregnated bundle of fibres may be given coherent form by heating it. The spinning solution, which may (U.S. Pat. No. 2,730,447) contain an agent to modify the flavour of the fibres produced, may have a protein concentration of from 10 to 30%, usually about 15%, by weight, this concentration being achieved by use of a pH sometimes stated to be in the range 9 to 13.5 (U.S. Pat. No. 3,210,195 and U.S. Pat. No. 3,403,027) but in practice at least 10.5 (U.S. Pat. No. 3,416,929) and typically 12.

A serious disadvantage of these known processes is their use of a high pH, which tends to cause degradation of the protein and requires complex procedures to ensure uniformity in the alkaline solution submitted to spinning.

The present invention avoids the use of a high pH, by preparing the plant protein in the form of a mesophase.

Animal protein in the form of a mesophase has already been described. Thus, in the academic paper published in 1944 entitled "The Dielectric Properties of Beta-Lactoglobulin in Aqueous Glycine Solutions and in the Liquid Crystalline State" by Shaw, Jansen and Lineweaver (Journal of Chemical Physics, Volume 12 No. 11 at pages 439 – 448; see particularly page 440), there is described a two-phase milk protein composition whose lower, denser phase is a protein mesophase: that is, a fluid aqueous protein composition which has a relatively high content of protein in the dissolved state and which is at room temperature appreciably more viscous than water and is capable of coexisting with and preparable from ordinary salt-containing aqueous solutions of the protein. Shaw, Jensen and Lineweaver prepared their beta-lactoglobulin mesophase by dialysing at 10° – 15°C a concentrated solution of beta-lactoglobulin containing sodium chloride until sufficient salt had been removed to cause some of the protein to separate as a lower 'oily' layer of mesophase. This mode of formation, and their properties, indicate that protein mesophases have a significant degree of internal molecular order. They are probably made up of aggregated units of the protein molecules present.

The mesophases of plant protein provided by the invention are new compositions, and combine fluidity with relatively high dissolved plant protein concentration at a pH well below that at which damage to the protein occurs. Additionally, by contrast with protein solutions of high pH, which tend to degrade on heating, these protein compositions can be hardened by heat as distinct from the action of acids. These properties make the compositions useful per se, and— when the ingredients of them besides the protein are chosen for edibility — specially suited to the production of foodstuffs, particularly in fibre form. The compositions are also useful in heat-setting binders for other edible materials, such as comminuted meat.

The mesophases of the invention comprise from about 15 to about 50% by weight of a substantially undenatured plant protein in a dissolved state in water, and a water-soluble salt in a concentration sufficient to effect said dissolved state and compatible with said protein, and are stable fluids having a pH which, while most advantageously near the iso-electric pH of the protein (ie in the range 4 to 6) may be in the range of about 4 to about 7.5. The mesophases are capable of being coagulated (hardened or set) by heat. Their preferred protein content is 20 – 45% by weight.

The amount of water-soluble salt required is conveniently measured in terms of ionic strength. The actual minimum ionic strength required, which can be found by a simple test for any particular salt, depends on the individual salt and the protein concerned, but an ionic strength of 0.2 or above (calculated on the water content of the composition) is usually required. The ionic strength is calculated in accordance with the well-known equation (see Glasstone, *Text Book of Physical Chemistry*, published van Nostrand September 1944 at page 940)

$$\text{Ionic strength } (\mu) = \tfrac{1}{2}\Sigma c_i z_i^2$$

where
$c_i$ = molar concentration of each ion
$z_i$ = valence of each ion

The protein used to make the mesophases is undenatured, that is, in as near its natural condition as possible and in particular not subjected to extremes of pH as by alkali treatment, or to high temperatures or other damaging treatments.

The mesophases may be prepared in two ways. The first method involves preparing an aqueous salt-containing solution of the protein, and then altering the physical conditions in the solution in such a way as to cause a mesophase to separate. The alteration to be made depends on the nature of the solution; for example, the mesophase may be caused to separate by cooling (see Example 8 later in this specification) or by otherwise altering the aqueous environment. If for example the protein is being maintained in solution by a high concentration of salt, then the salt concentration can (following Shaw, Jansen and Lineweaver) be reduced by dialysis at lowered temperature (see Example 7) and a mesophase separated. The other method of making mesophases consists in mixing a protein isolate, water and water-soluble salt in the required proportions, as in Example 1 later, or in some cases simply mixing a protein isolate and salt (see Example 12).

During isolation for preparation of the mesophase the protein, for example soy or groundnut, is preferably precipitated at a pH of 4 to 6, the yield being highest at 4.8 to 4.9. Acid, preferably hydrochloric acid, or alkali, preferably caustic soda, may be added to change the pH, provided that care is taken to avoid a high local concentration during addition.

The following description is largely in terms of crude soy protein, but other plant proteins, for example purified soy protein, crude groundnut protein and arachin (a purified groundnut protein), rape protein, pea protein, cottonseed protein and sunflower seed protein, will form mesophases and can be used in the process of the invention. Moreover, mesophases may be formed from mixtures of proteins. Many proteins may be mixed into mesophases and incorporated into them, forming for example mesophases containing soy protein and zein or groundnut protein and zein, or soy protein and gelatin or casein, or meat proteins, or soy and groundnut protein together.

With some proteins, particularly soy protein, the presence of an anti-disulphide agent (an agent capable of preventing the formation of, or capable of breaking, disulphide links in the protein) is desirable for stability, or gelling may take place at room temperature at the high concentrations employed. Sulphites, bisulphites, and dithionites or mercaptoethanol and other sulphhydryl compounds are suitable agents.

Mesophases obtained under some conditions may in addition to the 15% or more of plant protein in the dissolved state contain a minor proportion (minor in relation to the dissolved protein) of dispersed amorphous protein, which gives the mesophase an opaque appearance. On centrifuging, the dispersed amorphous protein sediments and becomes concentrated in a lower layer, which in the Table following shortly is referred to as the 'denser mesophase'. At pH 4.9 soy protein gives a mesophase whose total protein content is in part made up of variable small amounts of such dispersed amorphous protein. At pH 6 a single transparent mesophase can be obtained from soy protein, with composition variable between 20% and 50% protein. Such variation is to be expected, as the effect of pH is different on the various proteins present and on their interactions.

The distinction between mesophases and ordinary salt-containing protein solutions is illustrated by the results, tabulated below, of certain experiments. In these experiments, soy protein isolate was mixed with water to give a final solids-not-ash content of 28.6% by weight (of which a small proportion, not more than one-tenth of the weight of the protein, was formed by carbohydrate material), and a solid salt was added and intimately mixed in. The mixture was centrifuged at 50,000$g_{av}$ for 60 minutes. The two layers that formed (upper and lower) were separated and analysed for total solids, ash and water. The table shows the protein content of the mesophases obtained at a salt concentration of 0.5M (molar), and for comparison the protein contents of solution and precipitated (solid) protein obtained at a salt concentration of 0.1M. The denser mesophase referred to was a dispersion of amorphous protein in the 'lighter mesophase'.

TABLE

| Salt employed | Molar concentration of salt | Ionic strength ($\mu$) of salt | Nature of upper and lower layers obtained after centrifuging: | |
|---|---|---|---|---|
| | | | Upper | Lower |
| Sodium nitrate | 0.1M | 0.1 | Solution containing 2.6% protein | Solid containing 46.8 protein |

TABLE-Continued

| Salt employed | Molar concentration of salt | Ionic strength ($\mu$) of salt | Nature of upper and lower layers obtained after centrifuging: Upper | Lower |
|---|---|---|---|---|
| do. | 0.5M | 0.5 | 'Lighter mesophase' containing 25% protein | 'Denser mesophase' containing 34.7% protein |
| Calcium chloride | 0.1M | 0.3 | Solution containing 5% protein | Solid containing 44.7% protein |
| do. | 0.5M | 1.5 | 'Lighter mesophase' containing 23% protein | 'Denser mesophase' containing 31.6% protein |
| Tetrabutyl ammonium bromide | 0.1M | 0.1 | Solution containing 4.35% protein | Solid containing 49.4% protein |
| do. | 0.5M | 0.5 | 'Lighter mesophase' containing 19.8% protein | 'Denser mesophase' containing 45% protein |

In each case the remainder of the composition was water with 1 or 2% ash content, depending on the salt added. The salts distributed approximately equally between the phases.

In addition, lithium chloride, sodium chloride, sodium sulphate, sodium tetraborate, sodium metaborate, sodium sulphite, potassium iodide, potassium chloride, ammonium chloride, magnesium chloride, calcium chloride and sodium phosphate or mixtures of them are effective in mesophase formation at ionic strengths of about 0.5. (We do not suggest that inedible salts such as lithium chloride and sodium borates are to be used in carrying out the invention as applied to foodstuffs.) Sodium bicarbonate, at a level of 0.5M will also produce the mesophases, either alone or in conjunction with other salts such as sodium chloride to give the required ionic strength. It has the advantage that it may be used to raise the pH of the system.

The effect of salts is mainly dependent on ionic strength, rather than the nature of the anions or cations, with certain exceptions such as aluminium chloride where specific interactions with the protein predominate. Part of the ionic strength may arise from salts present in the protein as ordinarily isolated, for example from meal, deriving from salts present in the source material (e.g. oil seed). However, salts present in the isolate, and other non-protein components present there, are not necessary to the formation of mesophases, which can for example be made from isolated purified groundnut and soy proteins.

At pH 4.9, soy mesophases form from soy protein at about 0.15M (0.45 ionic strength) with calcium chloride, at about 0.2 to 0.3M with ammonium chloride and at about 0.5M with sodium chloride. They remain stable up to at least 0.5M for calcium chloride and ammonium chloride, and 1.5M for sodium chloride.

Groundnut proteins behave similarly to soy protein in that mesophases can be prepared in the presence of sodium phosphate, or sodium chloride, or a mixture of the two. Samples of mesophases made by cooling saturated solutions in 10% w/v NaCl, and separating off the mesophase, had the composition:

40.6% protein, 52% water, 7.4% salt (2.5M on the water content). Similar samples made from 5% w/v solutions contained:

43.3% protein, 54.4% water, 2.3% salt (0.8M on the water content). All the samples had a pH of about 5.8.

Groundnut mesophase can also be made by directly mixing the protein, salt and water, in suitable proportions. For example when this protein at pH 5 is mixed with water containing 5 to 20% sodium chloride to give a 45% protein mix, a single fairly transparent mesophase appears. If more water, or salt solution, is added two phases appear; a second mesophase containing about 43% protein, and a protein solution containing a few percent protein, in equilibrium.

Groundnut protein does not require the presence of a disulphide link preventing agent, though it can be prepared in the presence of one.

Arachin, a purified groundnut protein, can be obtained as a mesophase with protein concentration 43.3% protein, made with 10% w/v sodium chloride solution.

The mesophases are stable to storage. They may for example be stored frozen and, while certain changes take place in the system (a shown by a more opaque appearance), a mesophase re-appears on thawing. This freeze-thaw capability is a valuable property.

The mesophases are resistant to precipitation with organic solvents, for example alcohols. When ethanol is added to a soy protein mesophase at pH's varying from 4.6 to 6.5, up to 40% by weight of ethanol based on the water present can be added before precipitation of the protein becomes apparent. This is a remarkable result, since glycinin, the major soy protein, is precipitated from ordinary solutions of low protein content by about 10% ethanol and most globular proteins are precipitated under similar conditions. Also, up to 40% of dioxan can be incorporated into soy protein mesophase before precipitation occurs. This exceptional stability is attributable to the molecular structure of the mesophases.

The stability of the mesophase to alcohol and dioxan allows the formation of compositions containing for example both soy protein, and zein, by the addition of a solution of zein in ethanol to the soy mesophase. Solutions of zein in aqueous ethanol having a concentration of from 20% to 40% can be used, and if desired, the soy protein mesophase can be diluted with a little ethanol before addition of the zein solution. The addition of zein generally increases the viscosity of the mesophase. Many other proteins may be added, without greatly affecting the properties of the mesophase. The most usual effect is an increase in viscosity.

Valuable products, suitable for incorporation in food products, are obtained by simply coagulating (setting) the mesophase. A desirable chewy texture can be imparted to food products by incorporating the set material therein as described later.

Set products can be incorporated into food products in various forms. A mass of liquid mesophase can be set in relatively large pieces, for example long strips or layers. These may then be diced to give meat-like chunks, or cumminuted to give simulated minced meat. The mesophase can also be extruded, e.g. in the form of fibres, which may for example be bound in a suitable matrix to yield simulated meat. Alternatively the mesophase before setting may itself be used as a binder for foodstuffs, for example meat pieces or simulated meat pieces, and subsequently set.

The process for producing the mesophases is relatively simple, and the avoidance of the highly alkaline conditions used in some prior processes facilitates the preparation of edible products of good nutritional value and acceptable taste and smell from soy meals and other protein sources. Mesophases may be used with ease in processing because of their fluidity and high protein content. They may for example readily be pumped. Also the relatively low cost of plant proteins such as soy protein (which are those preferably used in the invention) as compared with other sources of protein such as meat allows a substantial reduction in costs of product based on such sources without impairment of nutritional or organoleptic quality. Frequently an improved quality in these products may be obtained by the incorporation of mesophase. Plant protein such as soy protein need not at any stage be damaged during preparation of the mesophase from the meal and the level of 'bean' off-flavour in the product can be kept very low. When fibres are made, much of the bean flavour and colour is found after the extrusion in the setting bath, rather than bound to the protein.

Other material forming part of a finished food product can be incorporated before the mesophase is set. For example, ground particles of meat can be added to the mesophase and this gives a means of making use of meat that would otherwise be waste, for example trimmings or low quality cuts. When ground particles of meat are added to the mesophase, they appear to dissolve, while the viscosity of the mix hardly alters. True solution does not, in fact, take place since masses of fragmented muscle fibres which are striated and birefringent can be observed in the system when it is examined under the microscope. The apparent "solutions" of meat in mesophase may be shaped, for example by extrusion to form fibres, to give products very useful as simulated meat or for incorporation into meat products. The presence of the meat in the mesophase increases its value nutritionally, since the meat acts as a source of animal protein.

Further, the mesophases are capable of carrying at least part or both the soluble and the insoluble carbohydrate component of the oil seed meal, and accordingly high purification of the protein is unnecessary. Mesophases have been formed containing up to 40% of carbohydrate by weight based on the total weight of protein and carbohydrate, and these may be set. They may also be extruded to form fibres if any large pieces of insoluble carbohydrate are removed.

Mesophases containing carbohydrate may conveniently be formed from a mixture of protein isolate and the whole meal from which the isolate is derived by purification. For example, in the case of soy meal a mesophase can be prepared from a mixture of a protein isolate formed as previously described by a precipitation at the isoelectric pH with up to twice its weight of a solvent-extracted soy bean meal. The inclusion of carbohydrate also provides a method of softening the texture of the set mesophases. In particular, fibres produced from a mesophase containing carbohydrate have less mechanical strength than fibres containing protein, salt and water alone, and have a softer texture for eating when incorporated in food products. The texture of pieces of set mesophase may also be softened in this way.

Other materials, such as fat, may be incorporated into the protein mesophase. Aqueous protein mesophase containing emulsified fat may be set, or may be extruded as fibres which retain the fat. The use of fat emulsified in the mesophase provides a method of incorporating oil-soluble additives, such as flavouring and colouring materials, into a foodstuff containing material derived from a protein mesophase. The materials may be incorporated into fat, which is then emulsified into the mesophase. The materials are retained in the mesophase during processing, even when the mesophase is extruded into a bath to form fibres. If it is desired to use water-soluble flavouring of colouring agents, the agents are dissolved in water, which is then emulsified in fat. The fat is then emulsified in the mesophase to form a double emulsion. In this case the flavours and colouring agents are more tenaciously retained in the mesophase during fibre formation and other processing steps than if merely included direct. If no fat is included in the mesophase, then water-insoluble colouring and flavouring agents are used, and mixed directly into the mesophase.

The setting of the mesophase is conveniently by heating. The temperature required to set the mesophase is generally above 80°C, and a temperature above 90°C. is preferably employed. Setting may be in large pieces e.g. in moulds. Mesophase can be extruded into water or salt solution in the form of sheets, ribbons or fibres. Extrusion into cold, warm or hot water through a spinnaret yields discrete fibres. The fibres are set at the surface by loss of salt from the outer zone causing precipitation of protein. Fibres which are formed by extrusion into water at 80°C or above require no further treatment. If the temperature of the extrusion bath is below 80°C the fibres require a heat treatment or texturing to give them elasticity or "chewiness."

The main factors concerned in the speed of heat setting are the protein content of the mesophase and the kind of protein, the salt content of the mesophase and the kind of salt, the temperature at which setting takes place and the pH of the mesophase. The higher the protein content and the higher the temperature, the more rapid the setting. As prepared, the protein mesophase is generally near its isoelectric pH (4.8 to 4.9 for soy) the yields in precipitating protein from extracts being best at that pH. Shifting the pH of the mesophase away from the isoelectric pH towards pH 4.0 or pH 6.0 increases the rate of heat setting. Also soy protein mesophase sets more rapidly than groundnut protein mesophase. As an example the fibres formed by extruding soy mesophase into water at a solids content of 33% by weight, a salt content of 4% sodium chloride by weight and a pH near the isoelectric pH are generally set by heating at 90° to 100°C for at least a second. Groundnut requires several seconds.

Varying the salt content of the mesophase when the salt used is the salt of a univalent cation and a univalent anion has a very marked effect in increasing the time of heat setting. For example, a mesophase containing 2% by weight of sodium chloride heat sets in 35 seconds at 91°C, whereas a similar mesophase containing 16% by weight of sodium chloride takes 59 minutes to set fully at that temperature. Potassium chloride and ammonium chloride also have a very marked effect in increasing the time of heat setting although they are not as effective in this as sodium chloride. The salts of divalent cations with monovalent anions, however, do not have a very strong effect on the time of heat setting. A mesophase containing 16% by weight of magnesium chloride takes about twice as long to set as mesophase containing 2% by weight of magnesium chloride. When mesophases are formed containing calcium chloride the time of heat setting is almost independent of the salt concentration.

The presence of small amounts of certain specific salts also has a marked effect on the time of heat setting even though larger amounts of other salts maya be present. For example, when mesophases are formed containing varying amounts of sodium chloride together with a small proportion of calcium chloride or magnesium chloride such as 0.5% by weight, the time of heat setting of mesophases containing concentrations of sodium chloride in the range of 4 to 12% by weight, is very much less than the time of heat setting of mesophase containing these proportions of sodium chloride without any other salt.

As noted above the mesophases may be spun or shaped into fibrous materials. The bath into which the fibres are extruded may be tap water, softened water or distilled water, or may be an aqueous solution of a salt. It is possible to extrude the mesophase into air with subsequent water treatment; for example the spinnaret may be above the bath as opposed to being in it. If the fibres produced are treated with hot water at above 80°C preferably 90°C to 100°C, or with steam for example on a conveyor belt, they become more elastic and tougher, with properties giving good texture on chewing, and can be made up into food products. Alternatively these fibres may be obtained by extruding the protein mesophase directly into hot water.

The mesophase may be extruded at protein contents up to about 50% by weight, the upper limit being determined as much by high viscosity as any other factor. The viscosity of the mesophases is non-Newtonian, and viscosities can therefore only be referred to as apparent viscosities. The apparent viscosities can vary for example between 0.2 poise for soy protein mesophases containing 23% protein to 2000 poise at 40% solids for the same protein at comparable shear rates. Using soy protein, mesophases of 30 to 34% protein by weight are preferred for fibre formation with apparent viscosities between 50 and 500 poises.

When the extrusion takes place into water below 25°C the fibres are soft and pasty and although on exposure to water at this temperature for many hours they become tougher, they do not develop the elastic qualities that appear at temperatures above 80°C. Accordingly alternative extrusion processes may be employed. In one of these, the "hot water" process, mesophases are extruded directly into water at 80° or 90° to 100°C. In the other, the "cold water" process, the mesophases are extruded into water at temperatures between 15° and 80°C; the fibres are given elasticity and the desired texture by subsequent heat treatment.

In the "cold water" process the formation of fibres is believed to depend on the formation of a skin over the surface of the fibre, this being formed of precipitated protein, caused by loss of salt into the bath from the mesophase. The fibre at this stage comprises a set outer skin containing fluid mesophase material. On heating, the fluid gives a textured material forming the bulk of the fibre. The skin is well defined as shown by electron micrographs. The cold setting process below 40° is reversible and a mass of such fibre may, if the surrounding salt concentration becomes high enough, revert to a mesophase. This tendency is eliminated or reduced by slightly raising the temperature of the water bath to 40° – 70°C. This temperature range is below that required to produce the elastic texture characteristic of fibres produced by the hot water process, but it improves the stability of the fibre towards salt solution. If the mesophase has been prepared at a pH above the isoelectric pH, a setting bath containing a buffer solution made up with 0.1M sodium acetate gives well-formed fibres.

In the hot water process, that is, at temperatures of the water bath above about 80°C and preferably above 90°C, the elastic fibres are formed directly. A skin is still formed, but the column (core) of liquid mesophase is rapidly converted to a cross linked mesh by the heat, as shown by electron micrographs of the heated fibres. The efficiency of the process is affected by the speed with which this happens. If it is not sufficiently rapid, the fibres, while still strong and elastic, become broken up into short lengths. These themselves are desirable and useful products, for example in the formation of simulated meats.

The protein content of the fibres is generally not the same as the protein content of the mesophase from which they were formed. The protein content is usually higher when extruding into water. When a mesophase having a protein content of about 25% is extruded into water, the fibres formed generally have a protein content of about 30 to 32%. If it is desired to produce fibres having a lower protein content, extrusion of a mesophase into a setting bath containing from 1 to 4% of a salt may be suitable. For example, if a soy protein mesophase containing sodium chloride is extruded into a bath of 1% sodium chloride solution the fibres formed generally have a somewhat lower protein content than the mesophase from which they are formed. If extrusion takes place into a bath containing a stronger sodium chloride solution, for example 4% by weight, the fibres formed have a much lower protein content than the mesophase from which they are formed.

The availability of a method of varying the protein content of the fibres is an important feature of the invention. The texture of the fibres produced depends to a large extent on the protein content; fibres having a high protein content are tougher and have a more chewy texture than those with a lower protein content, for exampale those produced by extrusion into a bath of high salt concentration. If it is desired to produce a foodstuff, for example a simulated meat, having a marked fibrous texture and requiring more chewing, fibres of high protein content, for example those produced by extrusion into a water bath, are used. It has been found that a small variation in the protein content, for example a 2 or 3% variation, has a marked effect on the texture of the fibres produced.

The use of a setting bath containing a salt solution also provides a means for varying other properties of the fibres. The presence of salt has a marked effect on skin formation of the fibres. The fibres extruded into a bath having a relatively high salt content, for example 4 to 8% by weight are translucent, swollen and fragile. In general, the diameter of the fibres produced is increased by extrusion into salt solution by comparison with extrusion into water. The presence of salt in the aqueous medium forming the setting bath appears to inhibit shrinkage of the fibres during setting. The fibres produced by extrusion into a salt solution have a smoother surface than fibres produced by extrusion into water alone. The fibres are also more translucent presumably indicating that the formation of a skin of precipitated protein is a less important feature of setting when the extrusion bath contains a salt, and the fibres are slower in setting and of lower protein content.

The pH of a water bath rapidly adjusts to that of the mesophase due to the very high buffering power of proteins. For this reason strong buffers, for example sodium acetate, must be used to adjust and hold the pH of the bath — if it is desired to control this.

Fibres produced by extrusion of mesophase through a spinnaret generally have a diameter wider than the holes in the spinnaret from which they were extruded and, as stated above, this effect is more marked when they are extruded into a salt solution. For example, when extrusion takes place into water through a spinnaret having holes of 0.1mm diameter the fibres produced which have a somewhat rough surface and an irregular cross-section have an average diameter of about 0.2mm. Similarly, fibres produced by extrusion through a spinnaret having holes of 0.2mm diameter have a diameter of about 0.3 to 0.4mm but fibres produced by extrusion through a spinnaret having holes of 0.5mm diameter having a diameter which is very little larger than the holes in the spinnaret. The fibres produced by extrusion through larger holes also have a smooth surface and a more regular cross-section.

In the hot water process it is desirable, in order to prevent the mesophase setting in the pipes leading to the spinnaret or in the spinnaret itself, that these should be kept at 20°C or below. For this reason, the pipes leading to the spinnaret are preferably water jacketed, and the spinnaret itself fitted with cooling channels, through which cold water is circulated. The mesophase should set just as, but not before, it emerges from the spinnaret.

The mesophases which are extruded need not be homogeneous. They may as mentioned earlier contain dispersed amorphous protein, and soy mesophases are often of this type, containing dispersed material of the order of 10 microns in size. When these are extruded, the holes in the spinnaret should have at least a certain minimum volume. It is important for maintaining a uniform and steady extrusion rate when mixtures of forms are being extruded that the total volume of the spinnaret hole should be appreciably larger than the volume of the dispersed material. This can easily be achieved by using spinnarets consisting of tubes, for example tubes 1 cm long and 0.1mm internal diameter. This restriction does not apply when extruding any homogeneous phase, and although the use of such tubes causes considerable shear forces on the mesophases prior to fibre formation it is believed that this is not important to fibre formation.

When using spinnarets containing holes of 0.1mm diameter or less it is desirable that larger pieces of carbohydrate should be removed from the original protein extract, for example by recentrifuging it.

An extrusion apparatus suitable for carrying out the process of the invention is shown in operation in the accompanying drawing.

A reservoir 1 contains mesophase 2 for spinning. The mesophase is fed to a gear pump 5, under the action of compressed air from a supply 3 pressing against a disc 4 which forms a piston to prevent channeling, and thence to the actual extruder generally indicated at 6. In the extruder the mesophase passes through a supply channel 7 to a spinnaret 8. The spinnaret is only diagrammatically shown but consists of 20 steel tubes of 0.2 mm internal diameter set in a steel plate to support them.

Cooling water passing through a jacket 10 from a supply 9 surrounds the mesophase until it enters the spinnaret. The water passes from the jacket through the spinnaret and thence to waste through a channel 11. The fibres, shown emerging at 12, pass into a water bath constituted by a stainless steel tank 13 and are carried away on a conveyor belt 14. The bath is provided with an electric heating element 15 powerful enough to maintain the bath at boiling if desired and situated beneath the extruder though separated from it by a baffle 16 to minimise direct heating and turbulence at the spinnaret.

The extrusion process is not confined to extrusion through spinnarets to form fibres; ribbons and other desired shapes can be formed. For example a mesophase may be extruded in the form of a corrugated ribbon and this material, when rolled gently, breaks up to yield a material resembling bunches of fibres. Such a material has a texture suitable for incorporation into food products for example, simulated meat products.

In an entirely different application, the mesophase can be used in the unset liquid form as a binder in food products. The products thus formed may be set by heating to a centre temperature of 80°C preferably 90°C.

The food products thus made may be based on a large variety of food materials especially meat and simulated meat products. Mesophase may be used to bind minced or diced meat or may be used to bind reformed meat made from milled raw meat and cooked mince meat which may be subsequently dried or canned. It may also be used as a binder for the set mesophase products, for example heat-set chunks or fibres, or for other vegetable protein products, for example the fibres produced by extrusion of an alkaline protein solution into an acid coagulating bath.

The mesophase when used as a binder has, we have found after setting in a variety of products, a particular advantage in texture over known binders, since it has a chewy texture of its own in addition to the textures given by the other material in it.

A further advantage of mesophase when used as a binder in meat products is its capacity to bind water and hence reduce the loss of weight of the meat when cooked. This binding of the fluids of the meat within the meat product improves the texture of the cooked meat, making it more juicy and tender. The water-holding capacity of mesophases and of meat mesophase mixture varies with pH, which makes it possible to form a meat product having a desired water-holding capacity while varying the proportions of meat and mesophase binder in the product.

When soy protein mesophase at its isoelectric pH (about 4.6 to 4.9) is added to mince meat and the mixture is heated to 100°C for an hour there is little variation in water-holding capacity up to about 40% mesophase content. Above this level of mesophase the expesssible juice decreases rapidly. The "expressible juice" is the weight percentage of liquor which can be decanted from a sample after centrifuging at 157,000g for 30 minutes in a 10 ml. tube. This is a very severe test of the water-holding capacity of the material. When pH of the mixture is increased, the expressible juice is markedly reduced (and the water-holding capacity increased). At about pH 6.5 to 6.8 the replacement of only 10% of the meat with mesophase causes a drop of up to 25% in the expressible juice.

When the mesophase is adjusted to the pH of the meat, which is 5.7, before mixing, the variation of expressible juice with mesophase level follows an intermediate course between the above two examples. An addition of 10% mesophase to the meat causes a drop in expressible juice and, thereafter, there is little change until the mesophase level is greater than 40%. This is a very useful property of the mesophase when used as a binder, since the mesophase can be added in proportions varying between 10 and 40% and it will increase the water-holding capacity of the meat to a desirable level for processed meat products. A further property of the mesophase is that it markedly reduces the viscosity of comminuted meat without altering the protein concentration. This makes it easier to mix and pump the meat in product manufacture.

The shaped heat-set mesophase products, for example diced or comminuted bulk set material or extruded fibres or rods, may be used by incorporation in a variety of foodstuffs or alternatively substantially on their own suitably flavoured and, if desired, supplemented with amino acids or a small proportion of an animal protein, for example casein. They can be set in a matrix of coagulable protein which may itself be a mesophase if desired. Two or more forms of heat-set mesophase, for examples fibres and dices bulk set material may be incorporated into a foodstuff if desired. These heat-set materials may be used to replace all or part of the cooked meat ingredient in known foodstuffs.

The amounts of the fibres, the set pieces or liquid mesophase binder to incorporate in the meat products will vary according to the product considered. For instance in the product of the beefburger type which is formed from minced beef as the major ingredients together with onion and other flavours, up to 60% by weight of the meat may be replaced by protein mesophase fibres, substitution of 20% to 40% by weight of the meat by fibres yielding a particularly good product. The texture of the product is improved in this way, since it becomes more fibrous. The yield of the product on cooking is also improved. Alternatively, up to 40% of the meat may be replaced by bulk set mesophase binder, which may be minced together with the meat.

A dried meat product can be produced from a mixture of fine milled raw meat and minced cooked meat. In the formation of such a meat product there is the possibility of using mesophase in any of its three forms. The raw meat may be replaced partly or wholly by unset mesophase binder and the mix heat-set to a centre temperature of at least 80°C. For example, about 50% of the raw meat may be replaced by unset mesophase binder yielding a product having an improved and juicier texture. Moreover this meat product can be rehydrated as discrete coherent pieces, with none of the crumbling of the rehydrated product which is often a drawback of such meats. Alternatively or additionally some or all of the cooked meat content of the dried meat may be replaced by heat-set pieces or fibres. For example, if fibres are incorporated into the cooked meat portion of dried meat the product has an improved texture due to increased fibrosity.

It is possible to produce a dried meat substitute formed wholly from vegetable protein using unset mesophase binder as a matrix for heat-set mesophase protein fibres and subsequently heating the product to set the binder. Flavouring substances, for example beef and chicken flavours, and permitted colouring may be incorporated in the product before or after setting.

The artificial meats formed partly or wholly from protein mesophases may also be used in pies, for example in pork pies. The texture of the bulk set mesophase is more suitable for pork pies than that of the fibres and if a proportion of the meat of the pie is replaced by bulk set protein mesophase a more succulent product may be obtained. In this application it is preferable to use a mesophase having a solids content in the lower end of the range in which mesophase will form, for example about 20% solids by weight, as this gives a product having a slightly softer texture. It is also possible for meat for pork pies to use unset binder as a replacement for part of the meat, preferably in addition to the use of minced set pieces.

Mesophase protein may also be used for canned and frozen meat products from milled raw meat and cooked mince meat and as with the dried product meat the raw meat may be partially or wholly replaced by unset mesophase binder, for example up to 40% of the raw meat may be so replaced, or the cooked meat may be replaced by bulk set mesophase protein or by mesophase fibres, for example up to 50% of the cooked meat may be so replaced. In the case of the canned product, a product having a particularly desirable chewy texture which is an improvement over the corresponding product containing no vegetable protein, can be obtained by using bulk heat-set mesophase protein to replace a proportion of the cooked meat. It is also noticed that when soy protein is used to form a mesophase and this is subsequently used as a binder for heat-set pieces of a meat product the soy off-flavour which is frequently found in soy materials is absent even if the products are canned.

Reformed meat may be made in the same way and may be used as an ingredient in frozen products such as meat pies, for example chicken pie or steak and kidney pie, or as an ingredient in boil-in-the-bag sauces.

Mesophase protein products, in particular bulk heat-set mesophase may be used in the formation of sausages. The set mesophase may be chopped in a bowl chopper in the process conventionally used for making sausages. As with pie meat, it is preferable to use a mesophase having a relatively low solids content and indeed generally when bulk heat-set mesophase is used mesophases having a low solids content yield a product which is softer textured.

A further use for the protein mesophase is in the formation of large regularly shaped pieces of meat formed by sticking together smaller pieces of meat. Such products are valuable commercially, for example when it is desired to produce slices of meat of a uniform size. The mesophase may be used in two ways to produce products of this type. It may be mixed in with the pieces of meat and the whole mass may be subsequently heat-set. This is similar to the use of mesophase as a binder in meat products. Alternatively, mesophase may be injected into the meat for example before it is subdivided into pieces and when the meat pieces are subsequently mixed together and heat-set the protein will exude from the meat pieces and upon heating will bind them together. The use of mesophase in this way gives the added advantage that the loss of fluids from the meat on cooking is reduced, and the texture of the meat is improved. The water binding power of the mesophase holds the fluids of the meat within the meat and these fluids give to the meat a more tender and more juicy texture.

If desired a meat-like product may be made from protein mesophase in which all the protein present is derived from vegetable protein and where no meat is present. One suitable method of doing this is to prepare a protein mesophase having a solids content of about 25% by weight, and to emulsify with this 10 to 30% by weight of fat based on the total weight of the mesophase. This mesophase emulsified with fat acts as a binder in the protein product and is used in an amount of 20 to 50% by weight of the whole product together with 50 to 80% by weight of fibres formed by protein mesophase. These fibres preferably have a relatively soft texture and this soft texture may be achieved by using fibres having a low protein content, for example 20 to 25% by weight of protein, or by using fibres containing carbohydrate. The fibres may suitably be those produced by extrusion of mesophase into a setting bath containing a salt solution. The binder ingredient and the fibres are mixed and the mixture may be moulded or extruded to align the fibres. The product comprising protein mesophase fibres bound in a matrix of heat-set mesophase may, if desired, be subsequently diced or divided into half inch chunks. The product has a chewy fibrous texture. Colouring and flavouring agents may be incorporated both into the protein mesophase which is emulsified with fat and into the protein mesophase from which fibres are formed. In the latter case, the colours and flavours are preferably incorporated into the mesophase before extrusion. If desired, fat may be incorporated into the mesophase before the formation of fibres.

EXAMPLES

The invention is illustrated by the following examples, wherein percentages are by weight unless otherwise stated:

EXAMPLE 1

Soy Fluff W, a low-temperature solvent extracted soybean meal was mixed with excess water containing 0.1% sodium sulphite and a few drops of silicone anti-foaming emulsion and centrifuged at 5,000 g to remove insoluble carbohydrate material. The supernatant liquid was then adjusted to pH 4.6 – 4.9 by adding hydrochloric acid. A white precipitate appeared and was at once collected by centrifuging as a buff-coloured, putty-like material. The analytical composition of the material prepared in this way was solids (excluding ash) 43 to 51% depending on the force exerted during centrifugation; water 48 to 56%; salts 1%. There was some 10% by weight on the protein of residual carbohydrate in the protein isolate. The solids-not-ash figures given include this carbohydrate.

250 g of the protein isolate, containing 43% solids-not-ash were mixed with 150 ml of water and 6 g of solid sodium chloride in a laboratory mixer to give a final solids-not-ash content of 27% and a final sodium chloride molarity on water of 0.39 (not including the salt derived from the soy bean meal), at pH 4.82. On mixing, viscosity dropped sharply and transparency increased. Air was removed by centrifuging at 600 $g_{av}$ for 15 minutes. A vacuum mixer can be used to avoid incorporation of air. The reservoir of the spinning machine was filled with the mesophase and it was pumped with a gear pump through a spinnaret containing 20 apertures of 0.2mm diameter into water at 20°C. Extrusion rates of 1.6 and 5 m/minute were used. White continuous fibres formed in both cases and were collected. After treatment for 1 minute in water at 90°C, the fibres were tough and elastic and suitable for incorporation into food products.

In runs of this example at mesophase pH's of 4.05 and pH 4.41 similar results were obtained. In a further run, at pH 4.65, in a spinnaret with 0.1mm holes and at an extrusion rate of 7 m/minute, similar results were again obtained.

EXAMPLE 2

500 g of protein isolate prepared as described in Example 1, containing 43% solids-not-ash were mixed with 200 ml of water and 14 g of solid sodium chloride in a laboratory mixer to give a final solids-not-ash content of 25% w/v and a final salt molarity of 0.53 on water (not including the salt derived from the soy bean meal). The pH was 4.8 to 4.9.

The mixture was then centrifuged at 9000 $g_{av}$ for 60 minutes. Two protein layers and a small pellet of carbohydrate separated. The upper protein layer, a transparent mesophase, was removed gently, without incorporating air, and the carbohydrate pellet was discarded.

The reservoir of a spinning machine was filled with the mesophase, which contained 23% protein, and it was pumped by a gear pump through a spinnaret into water at 20°C. The pumping rate was about 6 ml/minute and the spinnaret contained 2000 holes, each of 0.09 mm diameter, so the extrusion rate was about 0.5 m/minute. Continuous white fibres formed, and were collected. The bath water became slightly yellow, but no significant amount of protein dissolved in it. The fibres as extruded were treated at 95°C. in water for 1½ minutes and gave a good fibre suitable for incorporation in food products.

In a run at an extrusion pH of 4.65 similar results were obtained.

EXAMPLE 3

This example illustrates the use of various salts.

Similar procedure to that of Example 2 was followed and the reservoir of a spinning machine was filled with mesophase, containing 25% protein, prepared with 0.5M sodium nitrate in place of the sodium chloride solution.

This mesophase was pumped through a single nozzle of 2mm diameter, into water at 20°C. White continuous fibres formed and on texturing in hot water gave good fibres.

Similar runs with calcium chloride, potassium chloride, sodium phosphate and ammonium chloride also gave good results.

EXAMPLE 4

This example illustrates the extrusion of mesophases which are alkaline to the isoelectric pH.

200g of protein isolate (prepared as described in Example 1) of solids-not-ash 45% were mixed with 44 ml of water, 5.6g sodium chloride and 6.2g sodium bicarbonate in a laboratory mixer, to give a transparent mesophase pH 7.10, containing about 40% solids-not-ash and a total ionic strength of ca. 1.1 on water. The mixture was then centrifuged at $500g_{av}$ for 15 minutes, to de-gas.

The reservoir of a spinning machine was filled with the mesophase and it was pumped by a gear pump through a spinnaret containing 2000 holes of 0.09mm diameter into a bath containing tap water at 25°C. The extrusion rate was about 1 m/second. Weak fibres formed and were strengthened by heating the water to 95°C.

In a run of this example using a mesophase of pH 5.61 prepared using 3.1g of sodium bicarbonate and 5.6g of sodium chloride similar results were obtained.

EXAMPLE 5

This example illustrates the use of disulphide-bond preventing agents subsequent to isolation. 800 g of meal (Soy Fluff W, a solvent extracted meal) was mixed with 4 l. of water to give a mixture of pH 6.41. This was centrifuged to remove carbohydrate, and the supernatant was brought to pH 4.8 by adding hydrochloric acid. A precipitate formed, which was removed by centrifuging to give a sticky putty-like mass, of water content about 47% and solids 53%. The mass was mixed immediately after preparation with 2% (w/w) sodium chloride. A clear viscous liquid mesophase formed, which, if left, rapidly increased in viscosity, setting into a gel. 1% w/w mercaptoethanol was added to prevent this. Similarly, sodium sulphite (1% w/v) prevented gelation. The mesophases could be extruded and set as in Example 1.

EXAMPLE 6

This example illustrates the effect of various concentrations of sulphite during extraction.

20 g of meal (Soy Fluff W) was mixed with 200 ml of water containing amounts of sulphite as shown in the table below and centrifuged to remove carbohydrates after standing for about 30 minutes. From the supernatant (pH shown in column 3 of the table below), the extracted protein was precipitated by adjusting the pH to 4.8 with HCl. The yield of wet protein was as shown. The wet protein, containing about 45% protein was then mixed with 6 ml of 2% sodium chloride solution, and additional solid sodium chloride added to give a final content of 2% (w/w) on the whole mass, and a total protein of 35%. Mesophases formed, and were separated from each other by centrifuging: the less dense form was removed and analysed fro protein content with the result as shown. The mesophases remained stable showing only a small increase in viscosity over 48 hours.

Table

| Sample | Sulphite | pH | Yield wet protein | Mesophase protein content |
|---|---|---|---|---|
| 1 | 0.02% | 6.60 | 10.4g | 32.5 |
| 2 | 0.05% | 6.63 | 11.7 | 32.4 |
| 3 | 0.20% | 6.85 | 11.8 | 31.0 |
| 4 | 0.50% | 7.12 | 12.1 | 30.8 |
| 5 | 1.00% | 7.40 | 10.7 | 27.1 |
| 6 | 2.00% | 7.63 | 10.8 | 24.0 |

In a similar run 40 g of meal was mixed with 200 ml of water, and the total protein content of the mesophase was adjusted to 49% protein. Samples at 1 – 4 in the table gave viscous transparent mesophases, which remained stable for at least 24 hours. Samples 5 and 6 were opaque and even more viscous.

In both cases the mesophases could be extruded and set as in the previous example.

EXAMPLE 7

This example illustrates the preparation of the mesophase by cooling the dialysis.

A mixture of (i) 60 g of meal (Soy Fluff W) and (ii) 140 ml of a solution of potassium phosphate (0.035M) and sodium chloride (0.4M) at pH 7.6 and containing 1% mercaptoethanol, was centrifuged to remove insoluble carbohydrate, and the supernatant was cooled and dialysed against water at 4°C for 18 hours. A cloudy loose 'precipitate' of oily droplets appeared with were separated from the supernatant protein solution by centrifuging at 1000 g for 30 minutes in a cool centrifuge. The sediment, warmed to room temperature, was a mesophase and could be extruded and textured to form fibres as in Example 1. It remained stable for several days, and did not gel.

EXAMPLE 8

The example illustrates the use of groundnut protein, prepared from low-temperature solvent extracted meal.

40 g of protein was mixed with 200 ml of 12.5 (w/v) sodium chloride solution at pH 5, and kept at 50°C for an hour, before filtration in an oven at the same temperature, 50 ml of the salt solution being used in addition for washing. The filtrate became turbid on cooling in ice, and overnight 50 ml of an apparent precipitate separated. The supernatant protein solution was decanted and the 'precipitate' allowed to warm to 25+C when it formed a clear slightly brown mesophase.

In a further run the protein solution was dialysed against water at 4°C. A precipitate formed and after separation and warming formed a mesophase containing about 43% protein.

The mesophases could be extruded and textured as in Example 1.

EXAMPLE 9

300 g of the groundnut protein used in Example 8 was mixed with 700 ml of water and 28 g of solid sodium chloride in a laboratory mixer. The mixture was then centrifuged at 10,000 g for 30 minutes. Two layers formed, the upper one being a solution, of volume 386 ml containing 6.0% protein and 2.75% ash. The lower was a viscous slightly opaque mesophase with a pH of 5.25. The volume was 614 ml, and it contained 45.6% protein and 1.52% ash.

The mesophase could be extruded and textured as before.

EXAMPLE 10

Mixtures were made up in a similar way to that of Example 9 but containing approximately 45% protein.

They did not separate on centrifuging, giving viscous mesophases directly on mixing. The salt content was varied:

| SAMPLE | % NaCl (w/w water) | Protein in Mesophase | Ash |
| --- | --- | --- | --- |
| 1 | 5 | 42.9 | 3.1 |
| 2 | 10 | 43.1 | 5.1 |
| 3 | 20 | 40.2 | 10.8 |

The mesophase could be extruded and textured as before.

EXAMPLE 11

450 g of groundnut protein was mixed with 550 ml of 5% (w/v) sodium chloride solution to give a mesophase, as in Example 10. This was then further mixed with 5% (w/v) sodium chloride to give a range of total protein contents (23, 26, 30, 33, 36, 41, 43, 44%). After centrifuging, in every case, a sediment appeared containing 42.2 – 43.9% total solids and about 40% protein, together with a variable amount of supernatant, which was a solution containing about 9% protein. The pH was 5.25.

The mesophase could be extruded and textured as before.

EXAMPLE 12

This example illustrates the formation and extrusion of a mesophase from rape protein.

1 kilogram of ground rapeseed was extracted by stirring for 4 hours with 2.5 litres of a 2:1 mixture of chloroform and methanol. A 500 gram sample of the defatted seed was then extracted with 5 litres of water adjusted to pH 7.1 with sodium hydroxide. Carbohydrate was removed by centrifuging and the pH was adjusted to 5, bringing down a brown protein precipitate; 4% by weight of sodium chloride was added to the wet precipitate and a viscous liquid mesophase was produced.

This mesophase was extruded into cold water and light brown pasty fibres were obtained. These could be textured as described in Example 1.

EXAMPLE 13

This example illustrates the formation and extrusion of a mesophase from pea protein.

1 kilogram of dried peas were powdered and mixed with 10 litres of 0.1% sodium sulphite. The residues were removed by settling and centrifuging and the pH of the supernatant was then shifted from 6.5 to 4.8 with hydrochloric acid. A green protein precipitate appeared on centrifuging. 4% by weight of sodium chloride were added to this precipitate and a viscous liquid mesophase was produced.

This mesophase was extruded into cold water. Soft fibres were produced which were given a chewy texture by heating in boiling water. Much of the colour of the peas was lost to the water of the extrusion bath which became green.

EXAMPLE 14

This example describes the preparation and extrusion of a soy bean protein mesophase containing carbohydrate, from soy meal.

580 grams of soy protein isolate prepared as described in Example 1 were mixed with 83 grams of soy Fluff W and a solution of 24.4 grams of sodium chloride in 336 grams of water was added. The mesophase produced had the following composition, the percentage being by weight:

| | |
| --- | --- |
| Total Solids Content | 42.1% |
| Ash | 3.3% |
| Protein | 30.2% |
| Carbohydrate | 8.6% |

This mesophase was extruded into water through a spinnaret containing 20 holes each of 0.2 mm diameter. Good continuous fibres formed at 95°C. These fibres were found to have carbohydrate content of 6.7%. The lower carbohydrate content of the fibres compared to the mesophase was due to the loss of soluble carbohydrate to the extrusion bath.

The mesophase containing 8.6% of carbohydrate was also extruded into water through a spinnaraet containing 20 holes each of 0.5 mm diameter. Again, good continuous fibres formed and these had a carbohydrate content of 7.4%.

EXAMPLE 15

460 grams of soy protein isolate prepared as described in Example 1, were mixed into 208 grams of Soy Fluff W and a solution of 22.5 grams sodium chloride and 332 grams water was added. A mesophase having the following composition was produced:

| | |
| --- | --- |
| Total Solids content | 45.0% |
| Ash | 2.2% |
| Protein | 29.6% |
| Carbohydrate | 12.4% |

In two separate experiments, this mesophase was extruded into water at 95°C. through spinnarets having holes of 0.2 and 0.5mm respectively. In both cases good continuous fibres were formed. The fibres produced by extrusion through holes of 0.2mm diameter had a carbohydrate content of 4.0%, whilst the fibres produced by extrusion through holes of 0.5 mm diameter had a carbohydrate content of 6.0%, showing that more soluble carbohydrate was lost from the fibres of smaller diameter.

EXAMPLE 16

361 grams of Soy Fluff W were mixed with 160 grams of the protein isolate prepared as described in Example 1, and a solution of 21.0 grams of sodium chloride in 545 grams of water was added. A mesophase having following composition was produced:

| | |
| --- | --- |
| Total Solids Content | 43.4% |
| Ash | 4.45% |
| Protein | 23.6% |
| Carbohydrate | 15.3% |

This mesophase was extruded into water through holes of 0.2 mm and 0.5 mm as described in Example 14. Soft fibres were produced which were mechanically weak, those which were produced by extrusion through holes of 0.5 mm diameter were fragmented. The soft weak fibres produced were useful for incorporation in meat products of the kind where a very fibrous, chewy texture was not desired. The carbohydrate content of the fibres was 4.2% for the fibres produced by extrusion through holes of 0.2 mm diameter and 5.7% for fibres produced by extrusion through holes of 0.5 mm diameter.

EXAMPLE 17

Part (a)

A soybean protein mesophase was prepared by mixing a precipitated protein isolate with salt and water. The mesophase contained about 4% sodium chloride based on the water present, and had a protein content of about 45% by weight. The pH of the mesophase preparation was 4.9. To this was added 15% by volume of ethanol. The mesophase remained stable. 1 ml of a 20% weight solution of zein in 60% aqueous ethanol was then added to 10 g of the system. This was incorporated into the mesophase to give a composition containing both soybean protein and zein, which was extruded into water. The fibres thus formed had a smoother, shinier appearance than those obtained from soybean protein mesophase alone. The fibres could be textured by heating.

Part (b)

To 10 g of the soybean protein mesophase described in Part (a) was added 16% of ethanol, followed by 1 ml of a 40% solution of zein in 60% aqueous ethanol. This preparation was extruded to form fibres as described above.

Part (c)

To 10g of the soybean protein mesophase described in Part (a) was added 12% of ethanol followed by 5 ml of a 40% solution of zein in ethanol. The composition obtained, which was noticeably more viscous than the original mesophase containing soybean protein alone, was extruded to form fibres, and these fibres were textured by treatment in hot water.

EXAMPLE 18

To 5g of the soybean protein mesophase prepared in Example 17 was added 10% of dioxan (toxic) followed by 1 ml of a 20% solution of zein in 60% aqueous dioxan. The composition obtained, containing both zein and soybean protein, was extruded into water and fibres formed. The fibres were strengthened by heat treatment.

EXAMPLE 19

This example illustrates the use of intermediate temperatures in the extrusion bath when making fibres. Mesophases of soy protein of pH 4.6 prepared as described in Example 1 were used at an extrusion rate of 2 m/minute through a spinnaret having holes of 0.2 mm diameter, the procedure being that of example 1. The results were similar to those of that example, runs being carried out at 30°C, 50°C and 80°C, the fibres being the more stable in the mass and the better in form the higher the temperature.

EXAMPLE 20

This example describes the extrusion of groundnut protein mesophase into baths at intermediate temperatures.

80g of protein was mixed with 120 ml of water and 12g of solid sodium chloride, and centrifuged at 5000 g for 15 minutes to de-gas: no phase separation occurred. The mesophase was then pumped from a reservoir by means of a gear pump through a spinnaret containing 20 holes of 0.2mm. Fibres formed, continuously, and were collected. The fibres were finally textured in hot water.

In further runs extrusion was into water at 40°C and 80°C. Good continuous fibres formed, somewhat more discrete and stable than those formed at 20°C.

All fibres were textured by suspension in boiling water for 2 minutes. They became strong and elastic with a good texture, suitable for incorporation into foodstuffs.

EXAMPLE 21

This example illustrates the use of hot water in the extrusion baths. 1000g of soy protein isolate prepared as described in Example 1, containing 43% solids-not-ash were mixed with 300 ml of water and 25 g of solid sodium chloride in a laboratory mixer to give a mesophase of pH 4.8, solids-not-ash content of 25% and a molarity on water of 0.5. This introduced air, which was removed by centrifuging at 600$g_{av}$ for 15 minutes.

1333g of the mesophase were placed in the reservoir of a spinning machine and pumped through a spinnaret containing 20 holes of 0.5mm diameter into a bath of distilled water at 95°C. The pumping rate was 40 ml/minute and the extrusion rate was 10 m/minute. 1317 g of wet fibres were produced, of composition 69.4% (w/w) water, and 30.6% solids. They contained 43.7 mg N/gm wet weight and had a protein content of about 85% (w/w of the dry weight).

The bath water contained 0.01% nitrogen and 0.43% solids. The bath contained only 15g of protein, if all the nitrogen was of protein origin. Analysis of the bath water after freeze drying showed that the nitrogen was mainly of non-protein origin, and virtually no protein was lost into the bath. The bath contained 164 mgm of sodium sulphite derived from the original protein isolate, and the fibres 34 mgm.

Much of the colouring and flavouring component of the soy protein preparation remained in the water bath after extrusion. The fibres were white and bland, and were strong and elastic, with a texture giving a good "chew". The initial pH of the bath was 5.2 and the final pH 4.80.

In runs with 0.2 and 0.1mm spinnaret holes at the same pH and at pH 4.25 and 4.61 (adjusted with HCl) similar results were obtained.

The fibres were rinsed with tap water before storage.

EXAMPLE 22

This example illustrates the effect of different protein contents in extrusion of mesophase into hot water. The procedure of Example 21 was followed except that mesophase containing 25% and 27.3% protein were used. Extrusion was at 6m/minute through a spinnaret having holes of 0.5mm diameter. Fibres formed but tended to break up giving a discontinuous product, useful but less desirable than the continuous fibres.

In runs at 35%, 38% and 41% protein continuous fibres were obtained.

EXAMPLE 23

The procedure of Example 4 was followed, using the mesophase having pH 5.61 but extruding into a solution of commercial sodium acetate 0.1M at pH 4.7. Fibres more discrete and continuous than those of Example 4 were obtained and treated in hot water as before. Fibres having a good texture were obtained.

In a further run using mesophase containing 32% solids-not-ash and a pH of 6.25 similar results were obtained.

In further runs again using the mesophase having 32% solids content and pH 6.25 the sodium acetate solution was at 70°C. Fibres more discrete and of greater stability in the mass were obtained.

EXAMPLE 24

The rape protein mesophase produced in Example 12 was extruded into water held at 95° to 100°C. Tough moderately elastic fibres with a good chewy texture and with a rather hot mustardy flavour were produced.

EXAMPLE 25

A soy protein mesophase having a protein content of 28.4% by weight was prepared by mixing protein isolate with salt and water. This mesophase was then extruded into a bath of water at 95°C through spinnarets of three different sizes. The diameter of the fibres produced was measured and their appearance was noted. The solids content, protein content, and ash content of the fibres was also measured. The results are shown in the following table:

|   | %H₂O | Solids Content (%) | % Ash | % Protein | Diameter of fibres | Appearance of fibres |
|---|---|---|---|---|---|---|
| 1) | 67.5 | 32.5 | 3.1 | 25.7 | — | — |
| 2) | 66.7 | 33.3 | 0.72 | 32.4 | 0.2mm | fragmented |
| 3) | 66.2 | 33.8 | 0.55 | 30.2 | 0.3–0.4mm | Smooth |
| 4) | 66.7 | 33.3 | 0.64 | 29.9 | 0.5–0.6mm | Smooth |

1) Mesophase before extrusion
2) Fibres extruded through 0.1mm holes
3) Fibres extruded through 0.2mm holes
4) Fibres extruded through 0.5mm holes

EXAMPLE 26

This example describes the extrusion of soy protein mesophase into baths having a varying concentration of sodium chloride.

A soy protein mesophase having a protein content of about 25% was prepared by mixing together a protein isolate and sodium chloride solution. The pH of this mesophase was adjusted to 4.4 with hydrochloric acid. In separate experiments, this mesophase was extruded into five different setting baths at 95°C containing a varying amount of sodium chloride. The following table compares the composition of the fibres formed by extrusion into the various baths. Before extrusion, the mesophase had a solids content of 31.3%, an ash content of 2.7% and a protein content of 24.9%. The fibres were washed with water before analysis.

| Salt Content of bath | Fibre Composition | | | |
|---|---|---|---|---|
|  | %H₂O | % Solids | % Ash | % Protein |
| 0 | 60.5 | 39.5 | 0.9 | 36.2 |
| 0.1% | 64.3 | 35.7 | 0.48 | 37.6 |
| 0.5% | 66.1 | 33.9 | 1.09 | 32.3 |
| 1.0% | 68.6 | 31.4 | 0.39 | 29.8 |
| 4.0% | 74.5 | 25.5 | 0.5 | 23.2 |

EXAMPLE 27

This example describes the extrusion into water and sodium chloride solution of a soy protein mesophase of pH 4.6 and having a protein content of 24.6%. The mesophase was prepared and extruded as described in Example 26. The mesophase before extrusion had a solids content of 30.4%, an ash content of 2.6% and a protein content of 24.6%. The results obtained after washing were:

| Salt Content of Bath | Fibre Composition | | | |
|---|---|---|---|---|
|  | %H₂O | % Solids | % Ash | % Protein |
| 0 | 60.3 | 39.7 | 0.9 | 35.8 |
| 4.0% | 74.2 | 25.8 | 0.3 | 23.2 |

EXAMPLE 28

This example describes the extrusion into water and sodium chloride solution of a soy protein mesophase of pH 5.0 and solids content 29.9%. The mesophase, which was prepared and extruded as described in Example 26, had a water content before extrusion of 70.1%, an ash content of 2.7% and a protein content of 24.3%.

| Salt Content of Bath | Fibre Composition | | | |
|---|---|---|---|---|
|  | %H₂O | % Solids | % Ash | % Protein |
| 0 | 64.3 | 35.7 | 0.8 | 32.6 |
| 4.0% | 76.5 | 23.5 | 0.4 | 21.5 |

EXAMPLE 29

This example describes the incorporation of soybean protein fibres into a meat product. The fibres used were prepared as described in Example 21 from a mesophase having a pH 4.8 extrusion through a spinnaret having holes of diameter 0.2mm.

a. Raw forequarter beef was coarsely milled through a 14 mm. plate. This was mixed with the protein mesophase fibres and other ingredients in the proportions shown below in a Hobart mixer using a paddle. The mix was moulded to form products of the "beefburger" type weighing 75 g and these were frozen at −20°C.

| Ingredients | % Formulation |
|---|---|
| milled beef | 48.0 |
| mesophase fibres | 32.0 |
| rusk | 6.4 |
| onion | 12.0 |
| flavouring agents, salt and spices | 1.4 |

The simulated beefburgers thus formed were fried for 10 minutes in medium hot fat (140°C).

For comparative purposes beefburgers containing 80% milled beef and no mesophase fibers with the same additional ingredients as set out above were prepared and fried. The products containing mesophase fibres were similar in appearance to the products containing 80% beef. They were found to have a good chewy texture which was preferred to the texture of the control containing no mesophase fibres. No objectionable soy off-flavour could be detected in the fried product.

The apparent yield of the product containing mesophase fibres after cooking calculated by comparing the weight of the product after and before cooking was found to be 93.3%, which was higher than the yield found for the control, which was 91.9%. This is a further advantage of the use of mesophase fibres in this product.

b. A meat product of the beefburger type was prepared as described in Part (1) except that it contained 64.0% milled beef and 16.0% mesophase fibre, the other ingredients being used in the same proportions. The product after cooking was again found to have a good chewy texture which was preferred to the texture of a control containing no mesophase fibre.

c. A product of the beefburger type was made as described in Part 1 except that it contained 32% milled beef and 48% mesophase fibre, the proportion of the other ingredients remaining the same. The product after frying had an acceptable texture, although this was more fibrous than would normally be expected in a beefburger. The advantage of a higher yield on cooking was again obtained.

EXAMPLE 30

A soybean protein mesophase having a total solids content of about 30% was prepared by mixing protein isolate, salt and water in the required proportions. The pH of the mesophase was adjusted to 5.8 – 6.0. The mesophase was then set in long strips by heating (to 100°C) and the bulk heat-set mesophase obtained was minced through a 5 mm plate.

Products of the beefburger type were obtained as described in Example 19 using the proportions of milled beef mesophase, rusk, onion, flavouring agents, salt and spices described in Part 1 of that example. In this case, however, the mesophase was in the form of minced bulk-set material prepared as described above. Simulated beefburgers were obtained and these could be fried.

EXAMPLE 31

This example describes the use of a mesophase as a binder in preparing a dried beef-based product.

A soy protein mesophase was prepared having a solids content of about 30% and its pH was adjusted with sodium bicarbonate to 5.8 – 6.0. The mesophase was then incorporated into a meat product formulation containing the ingredients listed below.

| Ingredients | % Formulation |
| --- | --- |
| milled raw meat | 16.83 |
| cooked meat | 40.40 |
| defatted liquor | 18.53 |
| fat | 5.72 |
| mesophase binder | 16.83 |
| salt and flavourings | 1.68 |

The mix was mould cooked in boiling water until it had a centre temperature of 85°C. It was then sliced and broken into pieces and the pieces were air dried at 50°C for 16 hours.

A control experiment was carried out using the same process but replacing the mesophase with an equal amount of the milled raw meat. The dried pieces obtained in each case were heated in boiling water for 10 minutes for assessment. The texture of the rehydrated pieces containing mesophase binder was preferred to that of the control pieces.

The above example was repeated using the same ingredients in the same proportions but heating the mix to a centre temperature of 95°C while cooking before drying. In this case the texture of the rehydrated pieces which contained mesophase was greatly preferred to control pieces prepared as described above. The rehydrated pieces were also found to have an improved texture over the pieces prepared by the process in which the mix containing mesophase was only heated to a centre temperature of 85°C. It was thus shown that heating to the higher temperature improved the texture (chewiness) of the product. No texture improvement was found when the control mix, which did not contain mesophase, was heated to a higher temperature before drying.

The yields of dried material from the cooked mix and of rehydrated meat from the dried material were calculated for the product containing mesophase (that heat-set to 95°C) and for the control. The ratio of the weight of dried pieces to the weight of the cooked pieces before drying was 1 : 2.53 in the case of the product containing mesophase, whereas it was 1 : 2.69 for the control. Thus the yield of dried meat product from the cooked mix was somewhat higher in the case of the dried pieces containing mesophase. Moreover, the proportional increase in weight on rehydration was 2.66 : 1 for the pieces containing mesophase compared with 2.57 : 1 for the control. There is thus a further increase in yield on rehydration.

EXAMPLE 32

A meat product was prepared using the same ingredients in the same proportions as in Example 31. After mixing the pH of the mix was adjusted to 5.6. The mix was then mould cooked in boiling water to a centre temperature of 95°C, sliced and broken into pieces and the pieces were air dried.

When the pieces were rehydrated they were found to have an improved texture over control pieces which did not contain any mesophase. The texture of the rehydrated pieces was similar to that of the pieces containing mesophase heated to a centre temperature of 95°C before drying which had had no pH adjustment, described in Example 31.

EXAMPLE 33

A dried meat product was prepared containing both the mesophase binder prepared as described in Example 31 and mesophase fibres of the type used in Example 29.

The formulation used was:

| Ingredients | %.Formulation |
| --- | --- |
| milled raw meat | 16.83 |
| cooked meat | 32.32 |
| defatted liquor | 18.53 |
| fat | 5.72 |
| liquid mesophase binder | 16.83 |
| mesophase fibres | 8.08 |
| salt and flavouring | 1.68 |

The mix was mould cooked in boiling water to a centre temperature of 85°C and was then sub-divided and air dried.

The dried pieces were heated in boiling water for 10 minutes for assessment.

On rehydration coherent pieces were obtained, although these were rather soft-textured. Rehydrated pieces having a firmer texture could be obtained if the mix was heated before drying to a centre temperature of 95°C.

EXAMPLE 34

A soy protein mesophase having a solids content of about 30% was prepared as described in Example 31; this was then diluted by the addition of 4% sodium chloride solution until the protein content was 20%. The pH of the mesophase was adjusted to 5.8 to 6.0 and it was then set by autoclaving at 5 p.s.i.g. for 30 minutes and the set material was minced through a 5 mm plate.

The minced bulk heat-set mesophase was used in meat for pork pies. The table below shows the proportion of ingredients used and the quantity of the meat mix used in each pie. The pork was mild cured and minced through a 5 mm plate. Minced fat was added to it to increase the fat level of the meat to about 40%. The ingredients were mixed together on a Hobart mixer using a paddle.

|  | Quantity used |
| --- | --- |
| pork meat | 132.7 g |
| heat-set mesophase | 76.6 g |
| fat | 12.0 g |
| water | 11.9 g |
| spice and salt mix | 3.9 g |

Hot water pastry was freshly made and moulded into cases around the meat while still warm. The pies were cooked and glazed for 1¼ hours and gelatin solution was added when they were cool.

A similar pie containing no mesophase was made as a comparison.
This had the formulation:

|  | Quantity used |
| --- | --- |
| pork meat | 223.5 g |
| water | 10.0 g |
| spice and salt mix | 4.18 g |

The pork pies formed containing mesophase had a succulent texture. A small taste panel was conducted in order to determine a preference for flavour and texture between the pie containing heat-set mesophase and the control pie which had a much higher meat content. Very few people could distinguish any difference between the pies and no significant preference was noted in spite of the big difference in the meat content.

For comparison a pie was made by the same process but using minced bulk heat-set mesophase which had a solids content of about 30%. The texture of this product, although still acceptable was not as succulent as that of the product using mesophase having a 20% solids content.

EXAMPLE 35

Pork pies were made by the process of Example 34 using quantities of ingredients listed below. The unset mesophase used was the 20% solids content mesophase prepared in Example 34. It was mixed in with the other ingredients after the pork and the heat-set mesophase had been minced.

|  | Quantity used |
| --- | --- |
| pork meat | 132.7 g |
| heat-set mesophase | 47.5 g |
| unset mesophase | 29.2 g |
| fat | 12.0 g |
| water | 11.9 g |
| spice and salt mix | 3.9 g |

The pork pies formed by the process of this example had a succulent texture which was rather softer than that of the pies prepared in Example 34. When a small taste panel experiment was conducted using a control pie prepared as in Example 34 there was again no significant preference for either pie and few people could distinguish any difference between the pie containing mesophase and the control containing a higher proportion of meat.

EXAMPLE 36

A soy-protein mesophase having a 20% solids content was prepared as described in Example 34. Soy Fluff W soybean meal was added to the protein mesophase in the ratio 1:19. This increased the proportion of carbohydrate in the mesophase but no phase separation occurred. This mesophase material was autoclaved at 5 p.s.i.g. for 30 minutes and was minced through a 5 mm plate.

Pork pies were then prepared by the method of Example 34 using the mesophase containing added soybean meal in place of the heat-set mesophase used in Example 34. Acceptable simulated pork pies were formed.

Pork pies were also formed by the method of Example 35 using the minced heat-set mesophase containing added soybean meal in place of the heat-set mesophase used in Example 35 and the unset mesophase containing added soybean meal in place of the unset mesophase used in Example 35. An acceptable simulated pork pie was again formed.

EXAMPLE 37

A meat product containing mesophase binder was prepared using the same ingredients as in Example 31. The ingredients were mixed and mould cooked as described in that Example.

After cooking, the meat products were chopped into pieces simulating stewed steak. These "stewed steak" pieces were incorporated with gravy into a pastry case to form a steak pie, which was then frozen. When the product was reheated it contained discrete coherent pieces of "meat" and had the same apparent meat content as a product in which raw meat was used instead of the mesophase binder.

The stewed steak pieces could also be canned in a savoury gravy. When this product was rewarmed, discrete coherent meat-like pieces were obtained, and no soy off-flavour was detectable.

EXAMPLE 38

A meat product was prepared incorporating minced heat-set mesophase material of the type used in Example 30. The process used for preparing the meat product was similar to that used in Example 37, and the following formulation was used:

|  | % Formulation |
|---|---|
| milled raw meat | 33.66 |
| cooked meat | 30.30 |
| heat-set mesophase | 10.10 |
| defatted liquor | 18.53 |
| fat | 5.72 |
| salt and flavourings | 1.68 |

The meat pieces were incorporated into frozen steak pies and canned meat products as described in Example 37, and were compared with a control which contained no mesophase material. The products containing mesophase had the appearance of discrete coherent pieces of meat and had the same apparent meat content as the control. The products containing mesophase were close textured with a good chewiness and their texture was preferred to that of the control.

EXAMPLE 39

A meat product in the form of pieces suitable for freezing or canning was prepared by the method of Example 38, using soy protein fibres of the type used in Example 29 in place of the heat-set mesophase. Soft textured products having a meat-like texture with a good fibrosity were obtained.

EXAMPLE 40

A meat product containing both mesophase binder and fibres formed from soy protein mesophase was prepared as described in Example 33. After cooking, the meat product was chopped into pieces and was used in frozen and canned products. Acceptable products having a meat-like texture were obtained.

What is claimed is:

1. A fluid aqueous protein composition comprising from about 15 to about 50% by weight of a substantially undenatured plant protein in the dissolved state, and a dissolved water-soluble edible salt selected from the group consisting of water-soluble edible salts of sodium, potassium, ammonium, calcium and magnesium, said dissolved water-soluble edible salt having a concentration sufficient to keep the protein dissolved and to give an ionic strength (based on the water content of said composition) of at least about 0.2, the composition containing at least about 50% by weight of water and having a pH in the range of about 4 to about 6 and being capable of being coagulated by heat.

2. A fluid aqueous protein composition according to claim 1, wherein the water-soluble edible salt is sodium chloride.

3. A fluid aqueous protein composition according to claim 2, wherein there is additionally present a dissolved agent capable of preventing the formation, or capable of breaking disulphide links in the protein.

4. A fluid aqueous protein composition according to claim 3, wherein said agent is selected from the group consisting of sulphites and bisulphites.

5. A fluid aqueous protein composition according to claim 2 wherein the plant protein is soy protein.

6. A fluid protein composition according to claim 2, wherein from about 20 to about 45% by weight of plant protein is present in the dissolved state.

7. A process for preparing edible protein fibres, comprising extruding a fluid aqueous protein composition according to claim 6, into an aqueous medium to form said fibres, and heating the fibres thus formed at above 80°C to result in setting thereof.

8. A process according to claim 7, wherein said aqueous medium is itself at above 80°C, so that said fibre formation and said heat setting occur substantially simultaneously.

9. An aqueous protein composition according to claim 2 which has been coagulated.

10. A coagulated protein composition according to claim 9 which is in the form of fibre.

11. A food product comprising a matrix of the coagulated aqueous protein composition of claim 9 having other edible material distributed therein.

12. A food product according to claim 11, wherein said other edible material is a mixture of cooked meat and comminuted raw meat, the food product being in dried form.

13. A food product comprising a matrix of the coagulated aqueous protein composition of claim 9 having distributed therein the coagulated aqueous protein composition in fibrous form.

14. A fluid aqueous protein composition comprising from about 15 to about 50% by weight of substantially undenatured soy protein in the dissolved state, an edible dissolved water-soluble salt selected from the group consisting of edible water-soluble salts of sodium, potassium, ammonium, calcium and magnesium, said salt having a concentration sufficient to keep the protein dissolved and to give an ionic strength (based on the water content of said composition) of at least about 0.2, and a dissolved agent capable of preventing the formation of, or capable of breaking, disulphide links in the protein, the composition being heat-coagulable, containing at least about 50% by weight of water, and having a pH in the range of about 4 to about 6.

15. A fluid aqueous soy protein composition according to claim 14, wherein the edible salt is sodium chloride.

* * * * *